Sept. 15, 1931.   J. H. VICTOR   1,823,341

GASKET

Filed Jan. 17, 1930

Inventor
John H. Victor
By Wm O Bell, atty.

Patented Sept. 15, 1931

1,823,341

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed January 17, 1930. Serial No. 421,567.

This invention relates to gaskets and it is particularly useful in gaskets of comparatively large size and which have narrow transverse sections like the gaskets employed for sealing the joint between the head and the block of an internal combustion engine. These engines now generally comprise six or eight cylinders arranged in alinement and as close together as they can be made, with the result that the gasket often has many narrow sections which are subjected to great pressure and strains in high compression motors. The gaskets are usually made in one piece and they are not only provided with large cylinder openings but also with many water circulation openings and bolt openings, with the result that the relatively large gasket is fragile in structure and may be easily distorted in shipping and handling. It is highly important that the gasket should be maintained in its original flat condition of uniform thickness and that it should be capable of conforming to any irregularity or unevenness in the faces of the head and block to seal the joint, and that it should withstand the extremes of motor heat and pressure.

The invention has for its object to provide a novel gasket for these and other purposes which has the stability required for maintaining it during shipping and handling in proper condition for use, which will effectively seal the joint to which it is applied, and which will resist the stresses and strains of continuous operation under the conditions of heavy loads, high speed and extreme motor heat.

A more particular object of the invention is to reinforce and strengthen the gasket in a novel manner so that at its narrowest sections it will be capable of resisting the extremes of motor heat and pressure under the most severe conditions.

With these and other ends in view I have illustrated the invention in an engine head gasket provided with cylinder openings and referring thereto.

Figure 1:
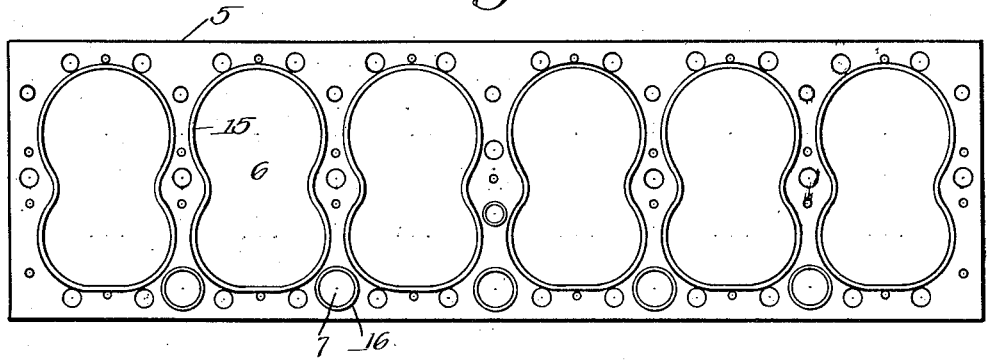
Fig. 1 is a plan view of one form of gasket selected for illustration.
Figure 2:
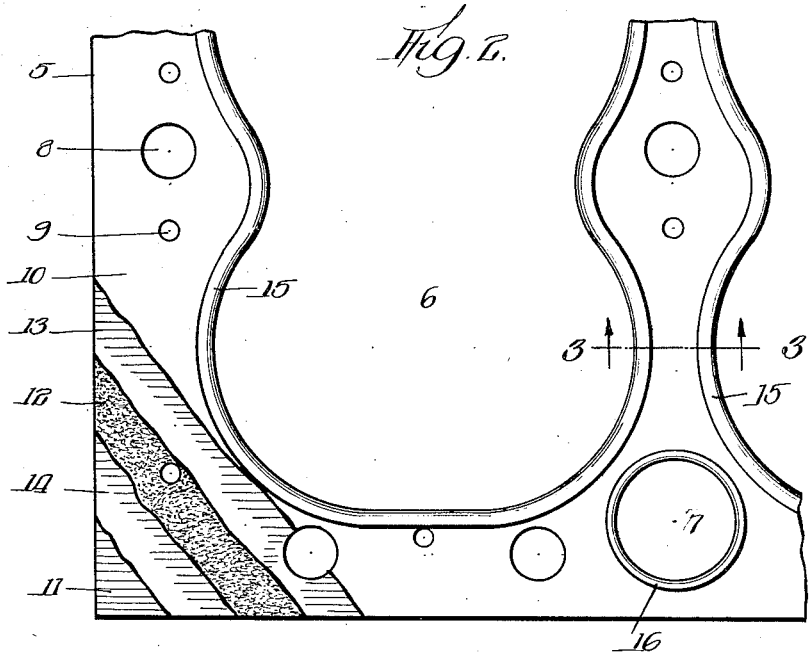
Fig. 2 is an enlarged fragmentary view with parts broken away.
Figure 3:
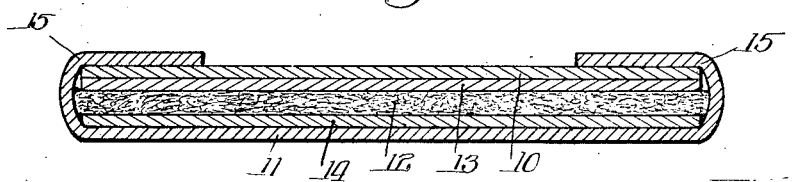
Fig. 3 is an enlarged sectional view on the line 3—3 of Fig. 2.

Referring to the drawings the gasket 5 has a plurality of cylinder openings 6, water circulation openings 7, bolt openings 8 and water ports 9. The cylinder openings are located close together to conform with the block construction and they provide a number of narrow sections as indicated at line 3—3 of Fig. 2. The gasket comprises two outer or facing members or layers 10, 11 which are stamped from thin sheet metal, preferably copper, and an intermediate core or layer or filler 12 of refractory material, preferably asbestos, is interposed between the facing members. The invention thus far described may be made in accordance with Frank J. Oven's Patent No. 1,472,133 patented October 30, 1923, or in other forms. The modern high-compression engines require gaskets of exceptional efficiency to resist the high heat and severe strains to which they are subjected and provide an efficient seal. This is particularly true because the cylinders are located close together and the gasket necessarily has many very small cross sections which are liable to be burned or blown out unless they are reinforced and strengthened to resist these severe conditions. The section indicated at the line 3—3 is a narrow section located between two cylinders and is one subjected to the most severe conditions of heat and pressure. The head is bolted tightly to the block upon the interposed gasket but, notwithstanding this, the engine pressure may be so great as to shift this narrow section bodily and laterally unless it is properly reinforced, and this shifting, of course, will result in destructive damage to the gasket by burning or cutting. Therefore, I provide two reinforcing layers 13, 14 stamped from thin sheet metal, preferably steel, which are arranged within the gasket between the facings 10, 11 and on opposite side of the core 12. The facings 10, 11, the core 12, and the reinforcing layers 13, 14 are stamped with openings which will perfectly aline when these parts are assembled in the complete gasket and the parts are held together with sufficient rigidity by the overlapping beads 15 to retain the parts in their proper relative position. In addition to the beads 15 about the cylinder openings 6 some of the smaller openings, as 7, may be provided with similar beads 16 and these beads will co-operate with the beads 15 to maintain the parts of the gasket in rigid alinement. It is highly desirable that the gasket should be flexible and yielding in order that it may conform with any irregularities or unevenness at the contact surfaces of the head and the block, but it should also be sufficiently stiff and rigid to keep the gasket in flat condition free from bends, wrinkles or other distortions, and it must have resisting qualities sufficient to enable its weakest sections to withstand the severe strains of continuous operation under heavy loads, high speed and extreme motor heat. The modern development of internal combustion engines has been in the direction of higher pressure and refinements of construction which bring the cylinders closer together and thereby make it necessary to provide very narrow sections in the gasket. These sections are usually located between cylinders and they are subjected at both edges to the extremes of heat and pressure. The result is that the gasket must be reinforced and strengthened not only to resist the usual action of heat and pressure but also to prevent narrow sections of the gasket from being shifted laterally by the high pressures developed. Some fuels for internal combustion engines create more heat than others and some engines are frequently required to operate under unusually strenuous conditions, and these conditions require greater service and efficiency on the part of the gaskets. The present invention satisfies these requirements and provides reinforcements which greatly strengthen the gasket laterally and particularly at its narrowest sections and which increase the flexibility of the gasket and at the same time make the gasket sufficiently rigid to prevent distortion in shipping and handling. The arrangement of the reinforcing layers on opposite sides of the relatively soft core and in contact with the facings is of importance because it provides for an even distribution of heat, preserves the yielding cushion quality of the copper facings and the core, and distributes the reinforcement of the gasket throughout the body thereof. This arrangement provides a well-balanced gasket with the reinforcement evenly distributed there through which makes it especially desirable for use in gaskets of large skeleton formation, with many openings and narrow sections. I have shown the invention in this form in the drawings but it is also useful in other forms of large gaskets, as well as in smaller gaskets, such as those employed in the engine exhaust; and changes may be made in the form, construction and arrangement of parts to adapt the invention for different uses within the scope of the following claim.

I claim:

A gasket of skeleton structure having thin metal facings, an intermediate layer of compressible material, a reinforcing layer of ductile metal corresponding in size to the size of the intermediate layer and interposed between the said compressible layer and each facing and contacting with the facing, said facings, intermediate layer, and reinforcing layers having registering openings, and means securing said parts together.

JOHN H. VICTOR.